United States Patent
Herbig et al.

(10) Patent No.: US 8,275,619 B2
(45) Date of Patent: Sep. 25, 2012

(54) SPEECH RECOGNITION

(75) Inventors: Tobias Herbig, Ulm (DE); Martin Raab, Ulm (DE); Raymond Brueckner, Blaustein (DE); Rainer Gruhn, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 498 days.

(21) Appl. No.: 12/552,517

(22) Filed: Sep. 2, 2009

(65) Prior Publication Data
US 2010/0057462 A1 Mar. 4, 2010

(30) Foreign Application Priority Data
Sep. 3, 2008 (EP) .................................. 08015561

(51) Int. Cl.
G10L 15/04 (2006.01)
G10L 15/28 (2006.01)

(52) U.S. Cl. .......................... 704/251; 704/255; 704/270

(58) Field of Classification Search ........... 704/200–278
See application file for complete search history.

(56) References Cited

U.S. PATENT DOCUMENTS

| | | | |
|---|---|---|---|
| 5,159,637 A * | 10/1992 | Okazaki et al. ............... | 704/238 |
| 5,864,810 A * | 1/1999 | Digalakis et al. ............. | 704/255 |
| 6,049,814 A * | 4/2000 | Serizawa ...................... | 708/422 |
| 7,472,061 B1 * | 12/2008 | Alewine et al. ............... | 704/243 |
| 7,912,721 B2 * | 3/2011 | Dow et al. ..................... | 704/270 |
| 2002/0087314 A1 * | 7/2002 | Fischer et al. ................ | 704/255 |
| 2003/0187645 A1 * | 10/2003 | Class et al. .................... | 704/256 |
| 2004/0148161 A1 * | 7/2004 | Das et al. ...................... | 704/224 |
| 2004/0199381 A1 * | 10/2004 | Sorin ............................. | 704/207 |
| 2004/0210438 A1 * | 10/2004 | Gillick et al. ................ | 704/254 |
| 2005/0228662 A1 * | 10/2005 | Bernard et al. ............... | 704/233 |
| 2006/0020463 A1 * | 1/2006 | Reich ............................ | 704/257 |
| 2008/0147404 A1 * | 6/2008 | Liu et al. ..................... | 704/256.2 |

OTHER PUBLICATIONS

Young, "A Review of Large-vocabulary Continuous-speech Recognition", IEEE Singal Processing Magazine, Sep. 1996.*
Raab et al. "Adaptation of Frequency Band Influence for Non-Native Speech Recognition", Proc. ESSV, Frankfurt, Sep. 2008.*
Abbasian et al. "Optimized Linear Discriminant Analysis for Extracting Robust Speech Features", ISCCSP 2008, Malta, Mar. 12-14, 2008.*
Arslan, L. M., et al., "Frequency Characteristics of Foreign Accented Speech," *Acoustics, Speech, and Signal Processing, IEEE Int'l*, vol. 2, Apr. 2, 1997, pp. 1123-1126.
Ferreira, A., "Static Features in Real-Time Recognition of Isolated Vowels at High Pitch," *Journal of the Acoustical Society of America*, vol. 122, No. 4, Oct. 1, 2007, pp. 2389-2404. He, X., et al., "Prior Knowledge Guided Maximum Expected Likelihood Based Model Selection and Adaptation for Nonnative Speech Recognition," *Computer Speech and Language*, vol. 21, No. 2, Nov. 12, 2006, pp. 247-265.
Raab, M., et al., "Multilingual Weighted Codebooks," *Acoustics, Speech and Signal Processing, IEEE Int'l*, Mar. 31, 2008, pp. 4257-4260.
European Patent Office, European Search Report; Application No. 08015561.7-2225; Nov. 18, 2008.

* cited by examiner

*Primary Examiner* — Jialong He
(74) *Attorney, Agent, or Firm* — Sunstein Kann Murphy & Timbers LLP

(57) ABSTRACT

The present invention relates to a method for speech recognition of a speech signal comprising the steps of providing at least one codebook comprising codebook entries, in particular, multivariate Gaussians of feature vectors, that are frequency weighted such that higher weights are assigned to entries corresponding to frequencies below a predetermined level than to entries corresponding to frequencies above the predetermined level and processing the speech signal for speech recognition comprising extracting at least one feature vector from the speech signal and matching the feature vector with the entries of the codebook.

13 Claims, 1 Drawing Sheet

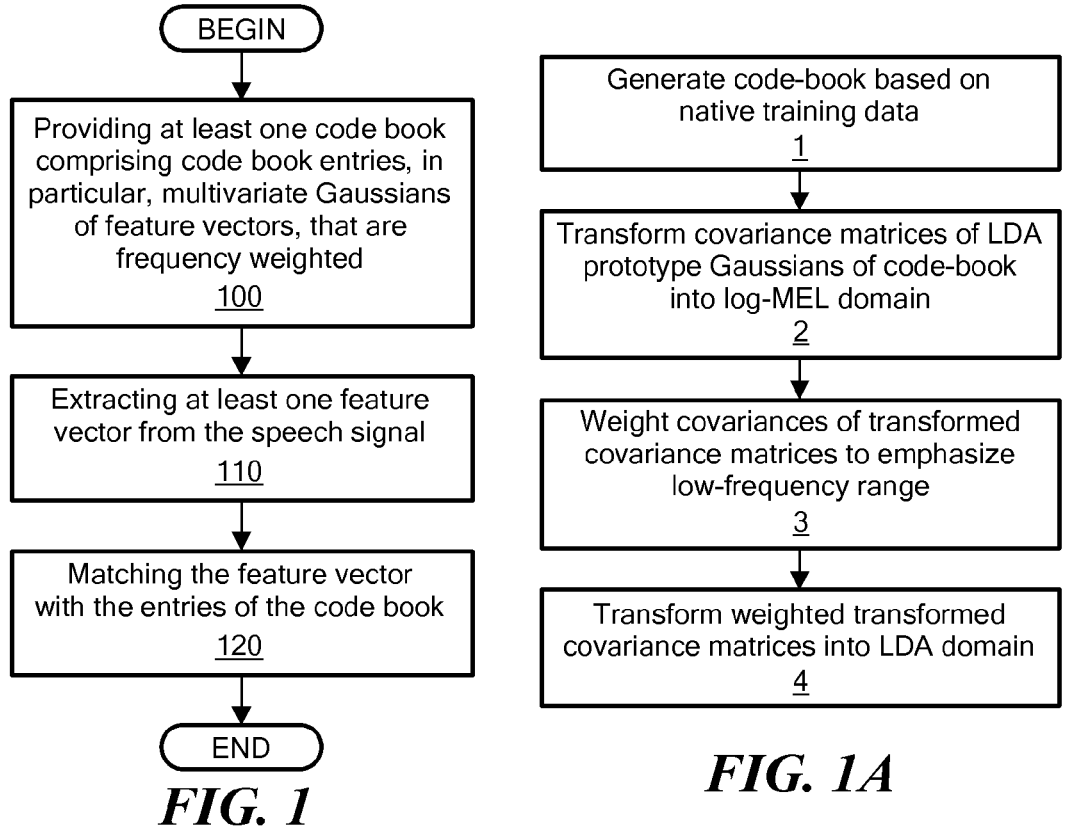
*FIG. 1*
*FIG. 1A*
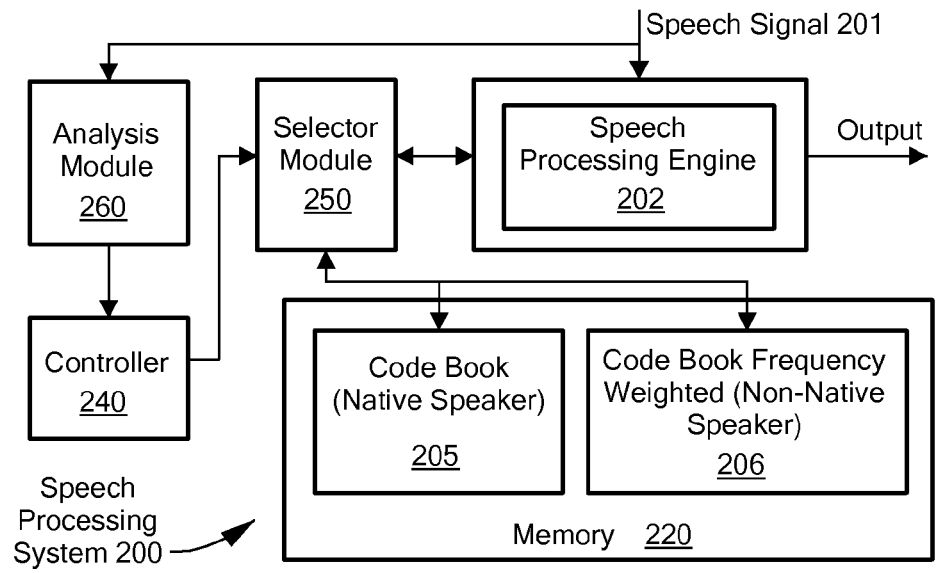
*FIG. 2*

SPEECH RECOGNITION

PRIORITY

The present U.S. patent application claims priority from European Patent Application 08015561.7 filed on Sep. 3, 2008 entitled, Speech Recognition, which is incorporated herein by reference in its entirety.

FIELD OF INVENTION

The present invention relates to the art of speech recognition. The invention is, particularly, directed to a method for machine speech recognition of utterances of a non-native speaker.

BACKGROUND OF THE INVENTION

The human voice can probably be considered as the most natural and comfortable man-computer interface. Voice input provides the advantages of hands-free operation, thereby, e.g., providing access for physically challenged users, and also of avoiding problems of learning an abstract computational syntax. Thus, software applications operated by verbal utterances that were long time desired by computer users.

In particular, due to the recent improvements of the computer capacities, e.g. regarding computing power and memory, on the one hand and theoretical speech analysis on the other hand, the development of speech dialog systems has been advanced considerably. Speech dialog systems are incorporated in multi-media systems that input, output and process speech, sounds, characters, numbers, graphics, images etc.

A basic element of spoken language input for a computer operation is speech recognition, i.e. the conversion of a speech signal to the corresponding orthographic representation by a set of words. The recognized words and sentences can be the final results, as for applications such as commands and data entry, or can serve as the input for further linguistic processing. Development has been made from isolated word recognition to continuous word recognition employing acoustic models and statistical language models.

The acoustic models usually comprise codebooks with Gaussians representing sounds of human utterances and Hidden Markov Models. The Hidden Markov Models (HMMs) represent a concatenation of allophones that constitute a linguistic word and are characterized by a sequence of states each of which has a well-defined transition probability. In order to recognize a spoken word, the systems have to compute the most likely sequence of states through the HMM. This calculation is usually performed by means of the Viterbi algorithm, which iteratively determines the most likely path through the associated trellis.

Both the codebooks and the HMMs are usually trained by speech data obtained by one or more native speakers. However, speech recognition and/or control means are not only used by native speakers but also by users of a different mother language than the one used for speech control. When utterances by non-native speakers are to be recognized by speech recognition and/or control means the error probability of the speech recognition process is significantly increased as compared to native speakers, since non-native speakers tend to pronounce words of foreign languages different from native speakers. It is, thus, a problem underlying the present invention to provide a method/apparatus for speech recognition that reliably operates in the case of speech input by a non-native speaker.

SUMMARY OF THE INVENTION

The above-mentioned problem is solved by the method for speech recognition of a speech signal according to claim 1 comprising:

providing at least one codebook comprising codebook entries, in particular, multivariate Gaussians of feature vectors, that are frequency weighted (such that weights are assigned to the entries dependent on frequencies); and processing the speech signal for speech recognition comprising extracting at least one feature vector from the speech signal and matching the feature vector with the entries of the codebook.

In particular, the code-book entries are frequency weighted such that higher weights are assigned to entries corresponding to frequencies below a predetermined level than to entries corresponding to frequencies above the predetermined level.

The feature vectors or characteristic vectors comprise parameters such as, e.g., formants, the pitch, the mean power and the spectral envelope, that are characteristic for a received speech signal. The codebook is part of an acoustic model used for the speech recognition process. It is known in the art to use such codebooks to look up Gaussians, for example, that best match the feature vector extracted from the speech signal. The Gaussians centers may, e.g., be defined by respective format frequencies. The Gaussians represent sound of a natural human language and matching of feature vectors with Gaussians results in outputs of the likelihood that an actual speech fragment/signal corresponds to the distributions given by the individual Gaussians.

In the art, the Gaussians are not frequency weighted. Utterances/pronunciations by non-native speakers, however, differ from the ones by native speakers mainly in the mid-frequency range, say above about 1 kHz. Thus, in the art, when a codebook trained by speech data obtained from a native speaker is used for speech recognition of an utterance by a non-native speaker, the recognition results are often not sufficiently reliable.

Contrary, in the present invention a codebook with frequency weighted entries is used for the recognition processing. Entries related to low-frequencies, in particular, frequencies below some kHz, e.g., below 1 kHz, are emphasized for the process of matching the extracted feature vector. For example, the provided at least one codebook can be regarded as a conventionally generated codebook (codebook based on speech data from one or more native speakers) that subsequently has been modified for emphasis of entries, in particular, Gaussians, related to low frequencies. Automatic recognition of a speech signal corresponding to an utterance by a non-native speaker is, thus, less error prone as compared to the art, since the mid/high-frequency contributions to the speech signals representing severe error sources for the recognition process are suppressed.

In particular, the inventive method does not comprise/require any adaptation of an acoustic model employed for speech recognition of utterances of a native speaker in terms of re-training Hidden Markov Models, modification of MEL filter banks, etc. in order to achieve reliable recognition results for utterances of a non-native speaker. Neither particular adaptation data nor retrained model speech data are necessary.

According to an embodiment the entries of the at least one codebook are obtained by detecting training speech signals corresponding to utterances of one or more native speakers;

transforming the training speech signals into the frequency domain, in particular, considering only the envelope of the training speech signals;

applying a MEL filterbank to the transformed training speech signals (i.e. to the training speech signals after transformation into the frequency domain) and save the log value of (the output of) each bank to derive first representations of the training speech signals;

applying a Discrete Cosine Transform to the first representations of the training speech signals to obtain second transformed training speech signals;

applying a Linear Discriminant Analysis to the second transformed training speech signals to obtain third transformed training speech signals; extracting feature vectors from the third transformed training speech signals;

determining covariance matrices for the extracted feature vectors in the Linear Discriminant Analysis domain;

transforming the covariance matrices from the Linear Discriminant Analysis domain into the log-MEL domain;

applying weights to the covariances of the covariance matrices in the log-MEL domain to obtain modified covariance matrices in the log-MEL domain; and transforming the modified covariance matrices from the log-MEL domain into the Linear Discriminant Analysis domain;

determining Gaussians from the modified covariance matrices to obtain the entries of the at least one codebook.

The first representations of the training speech signals represent the log values of the training speech signals after transform in the frequency domain and application of the MEL filterbank.

According to this embodiment, the codebook entries are Gaussians learned from training data wherein the training data comprises training speech signals that are transformed into the frequency domain and subject to both a Discrete Cosine Transform and Linear Discriminant Analysis before feature extraction and determination of prototype Gaussians representing the entries of the at least one codebook. Herein, signals, quantities, etc. are referred to as signals, quantities, etc. in a particular X domain after they have been transformed by a corresponding particular transformation X. Applying a Linear Discriminant Analysis to frequency sub-band speech signals (e.g., obtained by an analysis filter bank) means that these signals are subject to a discriminative feature transform by a transform matrix as known in the art.

The Linear Discriminant Analysis is a method known in the art to derive a linear combination of features with an optimal separation between two or more classes. One attribute of the Linear Discriminant Analysis is that it sorts the dimension of the feature space according to there importance for the representation of the classes. Hence the dimensionality of the feature space can be reduced with little loss of separation accuracy by discarding the least important dimensions of the feature space.

The Discrete Cosine Transform and Linear Discriminant Analysis, particularly, allow for the reduction of the number of dimensions of the resulting covariance matrices thereby providing the advantage of saving memory and processor resources.

The linear transformation of the covariance matrices into the Linear Discriminant Analysis domain, however, implies that the dimensions of the covariance matrices are no longer directly related to the frequency bands of the speech signal after transformation of this signal into the frequency domain, i.e., of the frequency sub-band speech signals corresponding to the speech signal in the time domain. Consequently, it is not at all obvious how to achieve the frequency weighting of the Gaussians/covariance matrices that build the codebook in the Linear Discriminant Analysis domain. Transformation of the covariance matrices from the Linear Discriminant Analysis domain into the log-MEL domain and weighting in the log-MEL domain solves this problem.

According to an alternative embodiment, Gaussians after the Discrete Cosine Transform only (before any Linear Discriminant Analysis) are provided. In this case, the covariance matrices of these Gaussians (in the Discrete Cosine Transform domain) are advantageously transformed into the log-MEL domain and weighted before back-transformation into the Linear Discriminant Analysis domain. This procedure may particularly be preferred when the Linear Discriminant Analysis results in a reduction of the number of dimensions of the covariance matrices and thereby in some (albeit probably not that relevant) information loss.

The method according to one of the above-described examples may further comprise transforming the speech signal into the frequency domain, in particular, considering only the envelope of the speech signal;

applying a MEL filterbank and save the log value of (the output of) each bank to derive a first representation of the speech signal;

applying a Discrete Cosine Transform to the first representation of the speech signal to obtain a second transformed speech signal;

applying a Linear Discriminant Analysis to the second transformed speech signal to obtain a third transformed speech signal;

extracting at least one feature vector from the third transformed speech signal; and recognizing the speech signal by determining a best matching Gaussian of the codebook for the extracted at least one feature vector. The recognizing process may also include the evaluation of Hidden Markov Models representing phonemes of speech and a (statistical) language model (see also description below). Thus, standard automatic/computer speech recognition may be performed by means of the inventive modified codebook in order to achieve reliable recognition results for utterances of non-native speakers.

The method according to one of the above-described examples may further comprise providing at least one additional codebook comprising codebook entries, in particular, multivariate Gaussians of feature vectors, without frequency weights;

determining whether the speech signal corresponds to the utterance of a native speaker or to the utterance of a non-native speaker; and if it is determined that the speech signal corresponds to the utterance of a native speaker, using the at least one additional codebook comprising codebook entries without frequency weights for the speech recognition; or if it is determined that the speech signal corresponds to the utterance of a non-native speaker, using the at least one codebook comprising codebook entries that are frequency weighted for the speech recognition.

According to this embodiment, codebooks optimized for native and non-native speech signals, respectively, can be used for the speech recognition processing. In particular, codebooks can be used for the recognition of a speech signal corresponding to the utterance of a native speaker without any modification taken into account. This is desirable with respect to the recognition of a speech signal corresponding to the utterance of a non-native speaker. The performance of a speech recognition means for a native speech input is not affected.

The step of determining whether the speech signal corresponds to the utterance of a native speaker or to the utterance of a non-native speaker may comprise either automatically classifying the speech signal as a signal corresponding to an utterance by a native or a non-native speaker or detecting an input by a user indicating that the speech signal corresponds to an utterance by a native or a non-native speaker. Automatic classification can be achieved by analyzing cross-word and interword coarticulation, disfluency, and prosody are among the features that differ in native and non-native speech, for example.

It is also provided a method for retrofitting a conventional speech recognition means that comprises at least one first code-book trained based on native speech data provided by one or more native speakers and having code bookentries, in particular, multivariate Gaussians, the method comprising the steps of weighting the entries of the at least one first code book such that higher weights are assigned to entries corresponding to frequencies below a predetermined level than to entries corresponding to frequencies above the predetermined level; and generating at least one second codebook to be used for speech recognition by the speech recognition system by storing the weighted entries of the at least one first codebook. The retrofitted speech recognition system allows for reliable recognition of both speech signals corresponding to utterances of a native speaker (employing the first codebook) and speech signals corresponding to utterances of a non-native speaker (employing the second codebook).

The step of weighting the entries of the at least one first codebook may comprise transforming covariance matrices stored in the at least one first codebook into the log-MEL domain;

applying weights to the covariances of the covariance matrices in the log-MEL domain to obtain modified covariance matrices in the log-MEL domain; and transforming the modified covariance matrices from the log-MEL domain into the Linear Discriminant Analysis domain;

determining Gaussians from the modified covariance matrices to obtain the entries of the at least one second codebook.

Moreover, as described above, covariance matrices may, in principle, be transformed from the Linear Discriminant Analysis domain or from the Discrete Cosine domain into the log-MEL domain for weighting of covariance matrices and subsequent transformation of the weighted covariance matrices into the Linear Discriminant Analysis domain.

Moreover, it is provided a computer program product comprising at least one computer readable medium having computer-executable instructions for performing one or more steps of the method of one of the preceding examples when run on a computer.

The above-mentioned problem is also solved by a speech recognition system, comprising at least one codebook comprising multivariate Gaussians stored in a memory; wherein the multivariate Gaussians are weighted such that higher weights are assigned to entries corresponding to frequencies below a predetermined level than to entries corresponding to frequencies above the predetermined level. In particular, the codebook may represent a conventional codebook generated from native speech data and modified in order to be more suitable for speech recognition of a speech signal corresponding to the utterance of a non-native speaker (see description above).

In the speech recognition system the memory may further comprise Hidden Markov Models and some language model and the speech recognition system is configured for speech recognition of an input speech signal based on the at least one codebook, the Hidden Markov Models and the language model.

The memory may further comprise at least one additional codebook comprising multivariate Gaussians that are not frequency weighted and the speech recognition system may further comprise a controller configured to control speech recognition of a speech signal input into the speech recognition system either based on the at least one code book comprising the weighted multivariate Gaussians or based on the at least one additional codebook comprising the multivariate Gaussians that are not frequency weighted. Thereby, speech recognition for both native and non-native speech inputs can reliably be achieved.

The speech recognition system may comprises a selection module that is configured to allow a user of the speech recognition system to cause the controller to either control speech recognition of the speech signal input into the speech recognition system based on the at least one codebook comprising the weighted multivariate Gaussians or based on the at least one additional codebook comprising the multivariate Gaussians that are not frequency weighted.

Alternatively or additionally, the speech recognition system may comprise an analysis module configured to determine whether the speech signal corresponds to an utterance of a native speaker or an utterance of a non-native speaker and to transmit a first signal to the controller, if it is determined that the speech signal corresponds to an utterance of a native speaker and to transmit a second signal to the controller, if it is determined that the speech signal corresponds to an utterance of a non-native speaker. In this case, the controller is configured to control speech recognition of the speech signal input into the speech recognition system based on the at least one additional code book comprising the multivariate Gaussians that are not frequency weighted, if it receives the first signal from the analysis module and to control speech recognition of the speech signal input into the speech recognition system based on the at least one codebook comprising the weighted multivariate Gaussians, if it receives the second signal from the analysis module.

Furthermore, herein it is provided a speech controller and a speech dialog system comprising the speech recognition system according to one of the above examples.

BRIEF DESCRIPTION OF THE DRAWINGS

Additional features and advantages of the present invention will be described with reference to the drawing. In the description, reference is made to the accompanying figures that are meant to illustrate preferred embodiments of the invention. It is understood that such embodiments do not represent the full scope of the invention.

FIG. 1 illustrates a processor-implemented method for speech recognition;

FIG. 1A illustrates an example of the herein disclosed method for speech recognition; and FIG. 2 shows a system for implementing an embodiment of the invention for accounting for non-native speaker pronunciations.

DETAILED DESCRIPTION OF SPECIFIC EMBODIMENTS

Disclosed herein are a system and computer-implemented methods and computer program products that account for differences in pronunciation by non-native speakers.

Speech recognition systems use an acoustic model that include codebooks with Gaussians representing sounds of human utterances and Hidden Markov Models that can be mapped to feature vectors extracted from received speech.

FIG. 1 shows a first method for enabling a speech recognition system that accounts for non-native speaker pronunciation. A code book is retrieved by a processor that contains multivariate Gaussians of feature vectors. The Gaussians centers may, e.g., be defined by respective format frequencies. The Gaussians represent sound of a natural human language and matching of feature vectors with Gaussians results in outputs of the likelihood that an actual speech fragment/signal corresponds to the distributions given by the individual Gaussians. The Gaussians are frequency weighted. The weighting is performed mainly in the mid-frequency range above about 1 kHz. 100. The speech signal is then processed by extracting at least one feature vector from the speech signal 110 and matching the feature vector with the entries of the codebook 120.

FIG. 1A shows a more detailed flow chart of FIG. 1. First, a code-book comprising prototype Gaussians representing sound of human natural language (e.g., English, French or German) is generated or provided 1 as it is known in the art. The codebook is generated from speech data obtained from at least one native speaker. The Gaussians are defined by respective covariance matrices (see also below). According to the present example, the Gaussians are obtained from speech signals that have been transformed into the frequency domain and that have been subject to a Discrete Cosine Transform and a Linear Discriminant Analysis both being linear operations performed by matrix multiplications with the frequency sub-band speech signals.

In order to generate a codebook that is more suitable for the recognition of utterances by non-native speakers, according to the present invention, the Gaussians are to be modified such that low-frequency parts of a speech signal that is to be recognized are emphasized, since non-native pronunciations of individual words differ from native ones more heavily in the mid/high-frequency range than in the low frequency range. The low-frequency range, for example, ranges from some Hz to about 1 kHz, particularly, from about 50 Hz to about 1 kHz or about 900 Hz or about 1.1 kHz.

To achieve the emphasis of low frequencies the covariance matrices of the prototype Gaussians of the codebook are transformed 2 into the log-MEL frequency domain. In principle, the MEL-frequency cepstrum (MFC) is a representation of the short-term power spectrum of a sound on a non-linear MEL scale of frequency as known in the art. Details of the transformation are given below. The covariances of the transformed covariance matrices are weighted 3 such that lower frequencies are emphasized. For example, frequency bands above some 1 kHz may be weighted by very small factors of about zero.

Then, the resulting weighted transformed covariance matrices are back-transformed to the Linear Discrete Analysis domain 4 and stored as a modified codebook suitable for speech recognition of speech inputs by non-native speakers. Thus, herein it is provided the generation of the modified codebook that can be used for speech recognition.

FIG. 2 shows an embodiment of a speech recognition system according to the present invention. As shown the system includes at least one codebook 206 comprising multivariate Gaussians stored in a memory 220. The multivariate Gaussians are weighted such that higher weights are assigned to entries corresponding to frequencies below a predetermined level (such as 1 KHz) than to entries corresponding to frequencies above the predetermined level. In particular, the codebook 206 may represent a conventional codebook 205 generated from native speech data and modified in order to be more suitable for speech recognition of a speech signal corresponding to the utterance of a non-native speaker (see description above).

In the speech recognition system that includes a speech processing engine 202, the memory 220 may further comprise Hidden Markov Models and some language model and the speech recognition system 200 is configured for speech recognition of an input speech signal 201 based on the at least one codebook 206, the Hidden Markov Models 207 and the language model 208.

The memory 220 may further comprise at least one additional codebook 205 comprising multivariate Gaussians that are not frequency weighted. The speech recognition system 200 may further comprise a controller 240 configured to control speech recognition of a speech signal 201 input into the speech recognition system 200 either based on the at least one code book 206 comprising the weighted multivariate Gaussians or based on the at least one additional codebook 205 comprising the multivariate Gaussians that are not frequency weighted. Thereby, speech recognition for both native and non-native speech inputs can reliably be achieved.

The speech recognition system 200 may comprises a selection module 250 that is configured to allow a user of the speech recognition system 200 to cause the controller 240 to either control speech recognition of the speech signal 201 input into the speech processing engine 202 based on the at least one codebook comprising the weighted multivariate Gaussians 206 or based on the at least one additional codebook comprising the multivariate Gaussians that are not frequency weighted 205.

Alternatively or additionally, the speech recognition system 200 may comprise an analysis module 260 configured to determine whether the speech signal corresponds to an utterance of a native speaker or an utterance of a non-native speaker and to transmit a first signal to the controller, if it is determined that the speech signal corresponds to an utterance of a native speaker and to transmit a second signal to the controller, if it is determined that the speech signal corresponds to an utterance of a non-native speaker. In this case, the controller is configured to control speech recognition of the speech signal input into the speech recognition system based on the at least one additional code book comprising the multivariate Gaussians that are not frequency weighted, if it receives the first signal from the analysis module and to control speech recognition of the speech signal input into the speech recognition system based on the at least one codebook comprising the weighted multivariate Gaussians, if it receives the second signal from the analysis module.

Furthermore, herein it is provided a speech controller and a speech dialog system comprising the speech recognition system according to one of the above examples.

It should be noted that actual speech recognition may advantageously make use of both the original codebook 205 comprising the prototype Gaussians and the modified codebook 206 comprising the weighted covariance matrices/Gaussians. In particular, the speech recognition system 200 incorporating an embodiment of the present invention may be equipped with a selection module 250 allowing a user to choose between speech recognition based on the original native speech data 205 stored in memory 220 or speech recognition employing the modified codebook including frequency weighted entries 206 stored in memory 220.

In the following some details of an example of the inventive method are given.

A multivariate Gaussian A(x) for a feature vector x in a feature domain of n dimensions is given by $$A(x) = \frac{1}{(2\pi)^{n/2}|\Sigma|^{1/2}}\exp\left(-\frac{1}{2}(x-\mu)^T\Sigma^{-1}(x-\mu)\right)$$

where the upper index T and μ denote the transposition operation and the mean feature vector, respectively, and the covariance matrix Σ (|Σ| denotes the determinant) is given by the n×n covariances $v_{ij}$ $$\Sigma = \begin{pmatrix} v_{11} & v_{12} & \Lambda & v_{1n} \\ v_{21} & v_{22} & \Lambda & v_{2n} \\ v_{31} & v_{32} & \Lambda & v_{3n} \\ M & M & O & M \\ v_{n1} & v_{n2} & \Lambda & v_{nn} \end{pmatrix}.$$

The feature vector comprises extracted feature parameters extracted from the speech signal as known in the art, e.g., the pitch, the spectral envelope, the cepstral coefficients, etc. The smaller the argument of the exponential function, i.e. the Mahalanobis distance between the feature vector x and the mean feature vector μ calculated from feature vectors of training data, the higher the likelihood of the Gaussian A(x).

Differences in one dimension will have less impact on the n-dimensional Mahalanobis distance when the variance of the Gaussian is high in that particular dimension. Thus, the likelihood can be modified by weighting the variance in one dimension by a weight factor $g_i^2$. Consequently, modified covariances $\bar{v}_{ij} = g_i g_j v_{ij}$ and a modified covariance matrix $$\bar{\Sigma} = \begin{pmatrix} g_1^2 v_{11} & g_1 g_2 v_{12} & \Lambda & g_1 g_n v_{1n} \\ g_2 g_1 v_{21} & g_2^2 v_{22} & \Lambda & g_2 g_n v_{2n} \\ g_3 g_1 v_{31} & g_3 g_2 v_{32} & \Lambda & g_3 g_n v_{3n} \\ M & M & O & M \\ g_n g_1 v_{n1} & g_n g_2 v_{n2} & \Lambda & g_n^2 v_{nn} \end{pmatrix}$$

result.

The modified covariance matrix can also be obtained by $\bar{\Sigma} = G*\Sigma*G^T$ with the transformation matrix G $$G = \begin{pmatrix} g_1 & 0 & 0 & \Lambda & 0 \\ 0 & g_2 & 0 & \Lambda & 0 \\ 0 & 0 & g_3 & \Lambda & 0 \\ M & M & M & O & M \\ 0 & 0 & 0 & \Lambda & g_n \end{pmatrix}.$$

Whereas, in principle, the feature vector may comprise log-MEL frequency representations of the speech signal, according to an example, the speech signal is transformed by an analysis filter bank from the time domain to the frequency domain and, subsequently, a Discrete Cosine Transform and a Linear Discriminant Analysis are applied to the frequency representation of the speech signal (sub-band signals in the frequency domain) before the Gaussians are estimated. The Linear Discriminant Analysis and the Discrete Cosine Transform can be advantageously by employed in order to reduce the number of dimensions of the feature domain and, thereby, reducing the demand for computer resources, in particular, memory resources and the processor load.

However, according to this example, the n dimensions of the feature domain are not directly related to different frequencies of the speech signal. This implies that frequency weighting is not achieved by simply applying weights to the (co)variances in particular dimensions as described above. Rather, according to the present invention the covariance matrix is transformed into the log-MEL domain before weighting.

Both the Linear Discriminant Analysis (LDA) and the Discrete Cosine Transform are linear transformations by matrices L and C, respectively. Transformation of a covariance matrix (and the corresponding Gaussian) in the LDA domain $\Sigma_{LDA}$ (after both Linear Discriminant Analysis and Discrete Cosine Transform) to a covariance matrix in log-MEL domain $\Sigma_{MEL}$ can, thus, be achieved by $$\Sigma_{MEL} = C^{-1}*L^{-1}*\Sigma_{LDA}*L^{-1^T}*C^{-1^T}.$$

In the following, it is assumed that the number of dimensions of the feature domain is not reduced by the Linear Discriminant Analysis and the Discrete Cosine Transform. In this case, the covariance matrix in log-MEL domain $\Sigma_{MEL}$ obtained by the above transformation is identical to a covariance matrix in log-MEL domain directly derived from log-MEL feature vectors.

The dimensions of the Gaussian with the covariance matrix in log-MEL domain $\Sigma_{MEL}$ directly correspond to the frequency bands of the speech signal transformed into the frequency domain. Accordingly, frequency weighting of the Gaussian can be achieved by $$\bar{\Sigma}_{MEL} = G*C^{-1}*L^{-1}*\Sigma_{LDA}*L^{-1^T}*C^{-1^T}*G^T$$

with the above-defined transformation matrix G. Back-transformation into LDA domain results in the modified covariance matrix $$\bar{\Sigma}_{LDA} = L*C*\bar{\Sigma}_{MEL}*C^T*L^T.$$

Since the Discrete Cosine Transform is orthonormal $(C^{-1^T} = C)$, $\bar{\Sigma}_{LDA}$ can be determined by $$\bar{\Sigma}_{LDA} = L*C*G*C^{-1}*L^{-1}*\Sigma_{LDA}*L^{-1^T}*C*G^T*C^{-1}*L^T.$$

According to another example, Gaussians derived before the application of the Linear Discriminant Analysis and after Discrete Cosine Transformation ($\Sigma_{DCT}$) are available. In this case, it may be preferred to obtain the modified covariance matrix in the LDA domain $\bar{\Sigma}_{LDA}$ from the covariance matrix derived after the Discrete Cosine Transformation (without LDA transformation) only, $\Sigma_{DCT}$, according to $$\bar{\Sigma}_{LDA} = = L*C*G*C^{-1}*\Sigma_{DCT}*C*G^T*C^{-1}*L^T.$$

In the above-described examples it was assumed that no reduction of the dimensions of the feature domain were performed by the Linear Discriminant Analysis and the Discrete Cosine Transformation and, thus, $$\Sigma_{MEL} = C^{-1}*L^{-1}*\Sigma_{LDA}*L^{-1^T}*C^{-1^T}$$

could be used without consideration of the dimension of the matrices. As already mentioned, however, both the Linear Discriminant Analysis and the Discrete Cosine Transformation are advantageously employed in order to reduce the number of dimensions of the feature domain by discarding particular dimensions when applying the Linear Discriminant Analysis and the Discrete Cosine Transformation to the speech signal after transformation into the frequency domain. If $D_{MEL}$, $D_{DCT}$ and $D_{LDA}$ denote the dimensions of the log-MEL domain, DCT domain (cepstrum domain) and LDA domain, respectively, e.g., $D_{MEL}$=122, $D_{DCT}$=99 and $D_{LDA}$=32, the above formula has to be modified according to $$\Sigma_{MEL}(D_{MEL} \times D_{MEL}) = C^{-1}(D_{MEL} \times D_{DCT}) * L^{-1}(D_{DCT} \times D_{LDA}) * \Sigma_{LDA}(D_{LDA} \times D_{LDA}) * L^{-1}(D_{LDA} \times D_{DCT}) * C^{-1}(D_{DCT} \times D_{MEL}),$$

where matrix multiplications reduce the dimensions of the resulting matrices to the respective lower dimensions indicated in the brackets and the transposition and inverting operations are performed for the corresponding square matrices as known by the skilled person. The other formulas given above are to be amended accordingly.

It should be recognized by one of ordinary skill in the art that the foregoing methodology may be performed in a signal processing system and that the signal processing system may include one or more processors for processing computer code representative of the foregoing described methodology. In certain embodiments, the disclosed methodology may be embodied as hardware or hardware and software. The computer code may be embodied on a tangible computer readable medium i.e. a computer program product.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

What is claimed is:

1. A processor implemented method for speech recognition of a speech signal comprising:
within a processor:
providing at least one codebook comprising codebook entries, in particular, multivariate Gaussians of feature vectors, that are frequency weighted; and
processing the speech signal for speech recognition comprising:
extracting at least one feature vector from the speech signal and matching the feature vector with the entries of the codebook;
providing at least one additional codebook comprising codebook entries, in particular, multivariate Gaussians of feature vectors, without frequency weights;
determining whether the speech signal corresponds to an utterance of a native speaker or to an utterance of a non-native speaker; and
if it is determined that the speech signal corresponds to the utterance of a native speaker, using the at least one additional codebook comprising codebook entries without frequency weights for the speech recognition; or
if it is determined that the speech signal corresponds to the utterance of a non-native speaker, using the at least one codebook comprising codebook entries that are frequency weighted for the speech recognition.

2. The method according to claim 1, wherein the entries of the at least one code-book are obtained by:
detecting training speech signals corresponding to utterances of one or more native speakers;
transforming the training speech signals into a frequency domain
applying a MEL filterbank to the transformed training speech signals in a log-Mel domain and saving the log value of each bank to derive first representations of the training speech signals;
applying a Discrete Cosine Transform to the first representations of the training speech signals to obtain second transformed training speech signals;
applying a Linear Discriminant Analysis to the second transformed training speech signals to obtain third transformed training speech signals;
extracting feature vectors from the third transformed training speech signals;
determining covariance matrices for the extracted feature vectors in the Linear Discriminant Analysis domain;
transforming the covariance matrices into the log-MEL domain;
applying weights to the covariances of the covariance matrices in the log-MEL domain to obtain modified covariance matrices in the log-MEL domain; and transforming the modified covariance matrices from the log-MEL domain into the Linear Discriminant Analysis domain; and determining Gaussians from the modified covariance matrices to obtain the entries of the at least one code-book.

3. The method according to claim 1, wherein the entries of the at least one code-book are obtained by:

detecting training speech signals corresponding to utterances of one or more native speakers;

transforming the training speech signals into a frequency domain;

applying a MEL filterbank to the transformed training speech signals in a log-Mel domain and saving the log value of each bank to derive first representations of the training speech signals;

applying a Discrete Cosine Transform to the first representations of the training speech signals to obtain second transformed training speech signals;

extracting feature vectors from the second transformed training speech signals;

determining covariance matrices for the extracted feature vectors in the Discrete Cosine Transform domain;

transforming the covariance matrices into the log-MEL domain;

applying weights to the covariances of the covariance matrices in the log-MEL domain to obtain modified covariance matrices in the log-MEL domain; and transforming the modified covariance matrices from the log-MEL domain into the Linear Discriminant Analysis domain;

determining Gaussians from the modified covariance matrices to obtain the entries of the at least one code-book.

4. The method according to claim 1, further comprising:

transforming the speech signal into a frequency domain, in particular, considering only the envelope of the speech signal;

applying a MEL filterbank to the transformed speech signal and save the log value of each bank to derive a first representation of the speech signal;

applying a Discrete Cosine Transform to the first representation of the speech signal to obtain a second transformed speech signal;

applying a Linear Discriminant Analysis to the second transformed speech signal to obtain a third transformed speech signal;

extracting at least one feature vector from the third transformed speech signal; and recognizing the speech signal by determining a best matching Gaussian of the codebook for the extracted at least one feature vector.

5. The method according to claim 1, further comprising:

generating likelihoods of sequences of speech segments by a Hidden Markov Model representing phonemes of speech; and recognizing at least one spoken word by means of the at least one codebook and the generated likelihoods.

6. The method according to claim 1, wherein determining whether the speech signal corresponds to the utterance of a native speaker or to the utterance of a non-native speaker comprises:

either:

a. automatically classifying the speech signal as a signal corresponding to an utterance by a native or a non-native speaker, or b. detecting an input by a user indicating that the speech signal corresponds to an utterance by a native or a non-native speaker.

7. A computer program product comprising a non-transitory computer readable medium having computer-executable instructions thereon for speech recognition of a speech signal comprising, the computer-executable instructions comprising:

computer code for providing at least one codebook comprising code-book entries, in particular, multivariate Gaussians of feature vectors, that are frequency weighted; and computer code for processing the speech signal for speech recognition comprising:

computer code for extracting at least one feature vector from the speech signal and computer code for matching the feature vector with the entries of the codebook;

computer code for providing at least one additional codebook comprising codebook entries, in particular, multivariate Gaussians of feature vectors, without frequency weights;

computer code for determining whether the speech signal corresponds to an utterance of a native speaker or to an utterance of a non-native speaker; and computer code for using the at least one additional codebook comprising codebook entries without frequency weights for the speech recognition if it is determined that the speech signal corresponds to the utterance of a native speaker;

computer code for using the at least one codebook comprising codebook entries that are frequency weighted for the speech recognition if it is determined that the speech signal corresponds to the utterance of a non-native speaker.

8. The computer program product according to claim 7, wherein the entries of the at least one code-book are obtained by:

detecting training speech signals corresponding to utterances of one or more native speakers;

transforming the training speech signals into a frequency domain;

applying a MEL filterbank to the transformed training speech signals and saving the log value of each bank to derive first representations of the training speech signals;

applying a Discrete Cosine Transform to the first representations of the training speech signals to obtain second transformed training speech signals;

applying a Linear Discriminant Analysis to the second transformed training speech signals to obtain third transformed training speech signals;

extracting feature vectors from the third transformed training speech signals;

determining covariance matrices for the extracted feature vectors in the Linear Discriminant Analysis domain;

transforming the covariance matrices into the log-MEL domain;

applying weights to the covariances of the covariance matrices in the log-MEL domain to obtain modified covariance matrices in the log-MEL domain;

transforming the modified covariance matrices from the log-MEL domain into the Linear Discriminant Analysis domain; and determining Gaussians from the modified covariance matrices to obtain the entries of the at least one code-book.

9. The computer program product according to claim 7, wherein the entries of the at least one code-book are obtained by:
- detecting training speech signals corresponding to utterances of one or more native speakers;
- transforming the training speech signals into a frequency domain;
- applying a MEL filterbank to the transformed training speech signals and saving the log value of each bank to derive first representations of the training speech signals;
- applying a Discrete Cosine Transform to the first representations of the training speech signals to obtain second transformed training speech signals;
- extracting feature vectors from the second transformed training speech signals;
- determining covariance matrices for the extracted feature vectors in the Discrete Cosine Transform domain;
- transforming the covariance matrices into the log-MEL domain;
- applying weights to the covariances of the covariance matrices in the log-MEL domain to obtain modified covariance matrices in the log-MEL domain;
- transforming the modified covariance matrices from the log-MEL domain into the Linear Discriminant Analysis domain; and
- determining Gaussians from the modified covariance matrices to obtain the entries of the at least one codebook.

10. The computer program product according to claim 7, further comprising:
- computer code for transforming the speech signal into the frequency domain;
- computer code for applying a MEL filterbank to the transformed speech signal and save the log value of each bank to derive a first representation of the speech signal;
- computer code for applying a Discrete Cosine Transform to the first representation of the speech signal to obtain a second transformed speech signal;
- computer code for applying a Linear Discriminant Analysis to the second transformed speech signal to obtain a third transformed speech signal;
- computer code for extracting at least one feature vector from the third transformed speech signal; and
- computer code for recognizing the speech signal by determining a best matching Gaussian of the codebook for the extracted at least one feature vector.

11. The computer program product according to claim 7, further comprising:
- computer code for generating likelihoods of sequences of speech segments by a Hidden Markov Model representing phonemes of speech; and
- computer code for recognizing at least one spoken word by means of the at least one codebook and the generated likelihoods.

12. The computer program product according to claim 11, wherein the computer code for determining whether the speech signal corresponds to the utterance of a native speaker or to the utterance of a non-native speaker comprises:
- computer code for automatically classifying the speech signal as a signal corresponding to an utterance by a native or a non-native speaker.

13. The computer program product according to claim 11 wherein the computer code for determining whether the speech signal corresponds to the utterance of a native speaker or to the utterance of a non-native speaker comprises:
- computer code for detecting an input by a user indicating that the speech signal corresponds to an utterance by a native or a non-native speaker.

* * * * *